Jan. 13, 1970 A. STRATIENKO 3,489,469

SUBMERGED BEARING ASSEMBLY

Filed Nov. 20, 1967 3 Sheets-Sheet 1

INVENTOR.
Andrew Stratienko

BY

Paul + Paul

ATTORNEYS.

INVENTOR.
Andrew Stratienko

BY

Paul & Paul
ATTORNEYS.

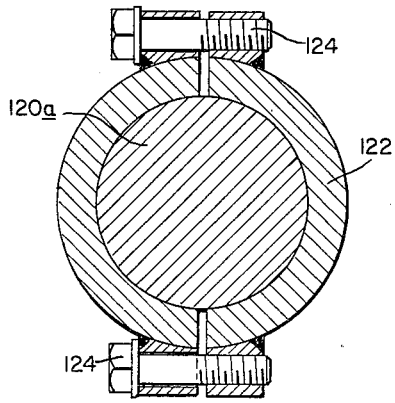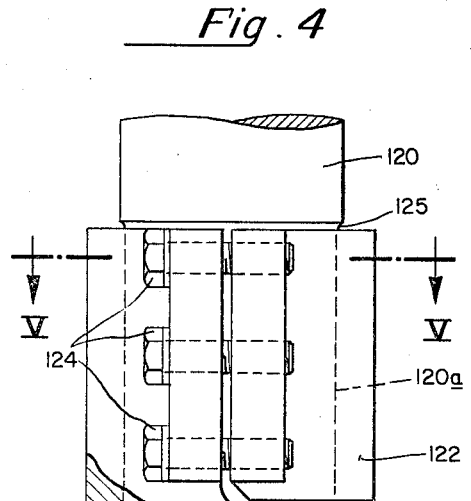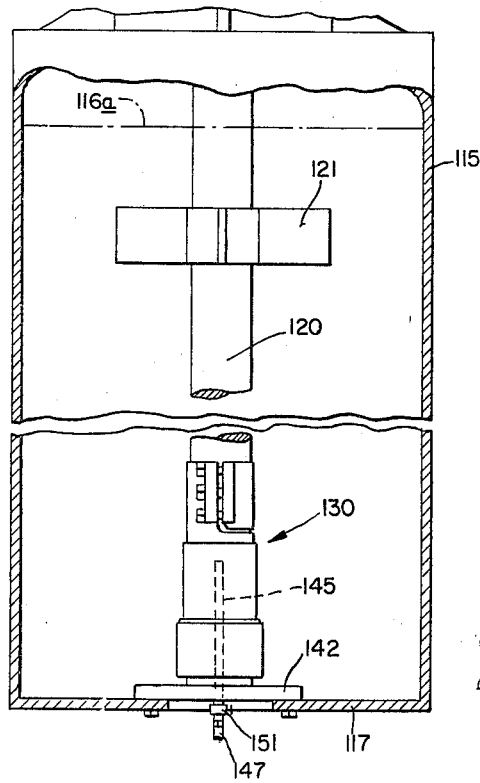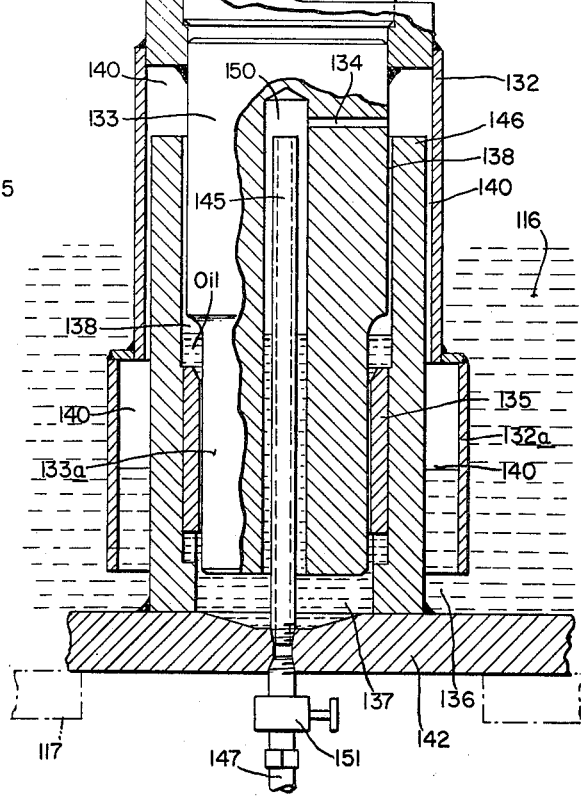
Fig. 4
Fig. 5
Fig. 3
INVENTOR.
Andrew Stratienko
BY
Paul + Paul
ATTORNEYS.

United States Patent Office 3,489,469
Patented Jan. 13, 1970

3,489,469
SUBMERGED BEARING ASSEMBLY
Andrew Stratienko, Philadelphia, Pa., assignor to King of Prussia Research and Development Corporation, King of Prussia, Pa., a corporation of Pennsylvania
Filed Nov. 20, 1967, Ser. No. 684,233
Int. Cl. F16c *33/72;* F16j *15/00, 15/40*
U.S. Cl. 308—36.3                                    4 Claims

ABSTRACT OF THE DISCLOSURE

In a mixing tank, a bearing assembly at the submerged end of the agitator shaft is isolated from the corrosive tank liquid by air or gas and provides transverse or radial bearing support for the shaft. The lower end of the normal agitator shaft is provided with a stub extension which bears against an annular bearing mounted in a bearing stand at the bottom of and inside the tank. The bearing stand is a hollow cylindrical fixed member which projects upwardly from the bottom of the tank and encircles the shaft extension. The bearing stand is, in turn, encircled by an outer hollow cylindrical housing member which is substantially coextensive with the shaft extension and which is secured to and rotates with the agitator shaft. This housing member functions as the outer wall of an air separation chamber. The shaft extension is provided with an axial air chamber having an IN port at the lower end and a radial air passage near the upper end to provide communication between the chamber of the shaft extension and the upper portion of the separation chamber. The lower end of the separation chamber communicates with tank body and allows the tank liquid to enter the lower end portion of the separation chamber. Air or gas is trapped in the separation chamber and prevents the tank liquid from reaching the bearings.

FIELD OF THE INVENTION

This invention relates to mixing tanks, and particularly to bearing support for the agitator shaft.

DESCRIPTION OF THE PRIOR ART

In prior-art mixing tanks having a vertical shaft which projects down into the tank and which is driven rotationally to rotate the impeller or impellers for mixing or agitating the liquid or semi-liquid contained in the tank, the shaft is supported against radial loads by bearing assemblies mounted outside and above the tank. The shaft may extend, for example, thirty feet down into the tank. The lower end of the shaft within the tank is, in the prior art, unsupported against radial loads, and because of the absence of radial bearing supports, the shaft must be made of good steel and have a diameter sufficient to withstand the radial loads imposed upon it. Moreover, the speed at which the agitator shaft is driven has to be limited to keep it below the critical speed. The prior art has avoided use of bearing supports at the submerged end of the agitator shaft because of the short life of such bearings due to corrosion from exposure to the acids or other tank liquids.

SUMMARY OF THE INVENTION

The present invention proposes a form of construction in which the lower end of the shaft is provided with a bearing assembly providing transverse or radial support for the shaft and wherein such bearings are protected from contact with the liquid or semi-liquid which is to mixed within the tank. Isolation of the bearings from the tank liquids is achieved by a construction which provides the bearing assembly with a protective atmosphere of air of other suitable gas. A supply of lubricant may also be provided for the bearings.

BRIEF DESCRIPTION OF THE DRAWING

FIG. 3 is a simplified diagrammatic elevational view, broken away, of a tank showing the preferred form of bearing assembly;

FIG. 4 is an enlarged view, in section, of the bearing assembly of FIG. 3; and

FIG. 5 is a plan view, in section, looking down along the line V—V of FIG. 4.

DESCRIPTION OF THE PREFERRED EMBODIMENT

Figure 1:
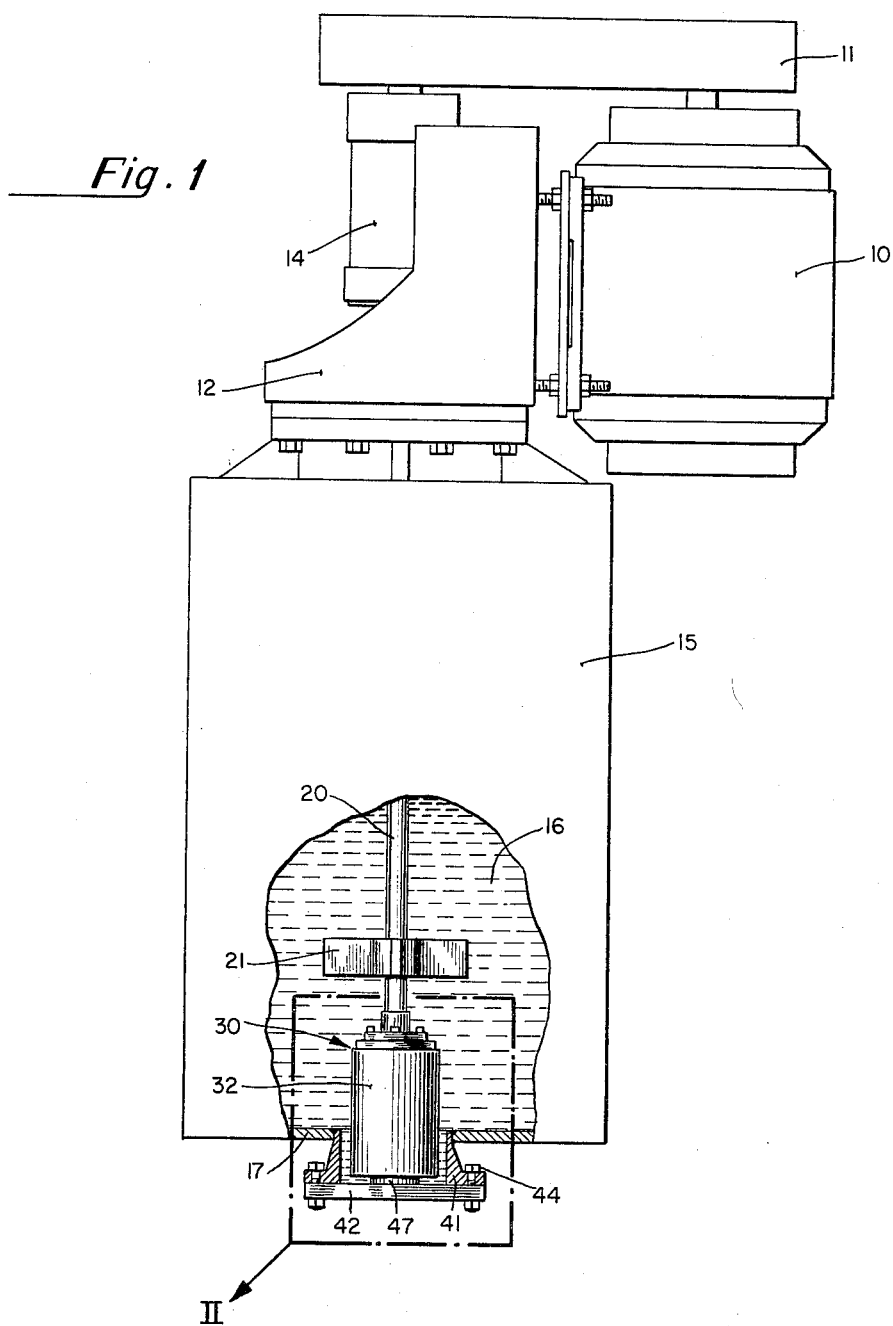
FIG. 1 is a simplified diagrammatic elevational view, partly broken away, of a tank having a vertical agitator shaft supported at its lower end by one form of bearing assembly, but not the preferred form.

Referring first to FIGURE 1, there is illustrated diagrammatically a vessel or tank 15 having therein a liquid 16 which may be assumed to be corrosive and which is to be agitated or mixed by one or more impellers 21 mounted on the rotary shaft 20. Mounted on the top of the tank 15 is a frame 12, and supported on the side of frame 12 is a motor 10 which drives a pulley and belt arrangement 11 which in turn drives rotationally the steel agitator shaft 20. The shaft 20 is supported at its upper end by spaced-apart bearing assemblies supported within the bearing housing 14.

Figure 2:
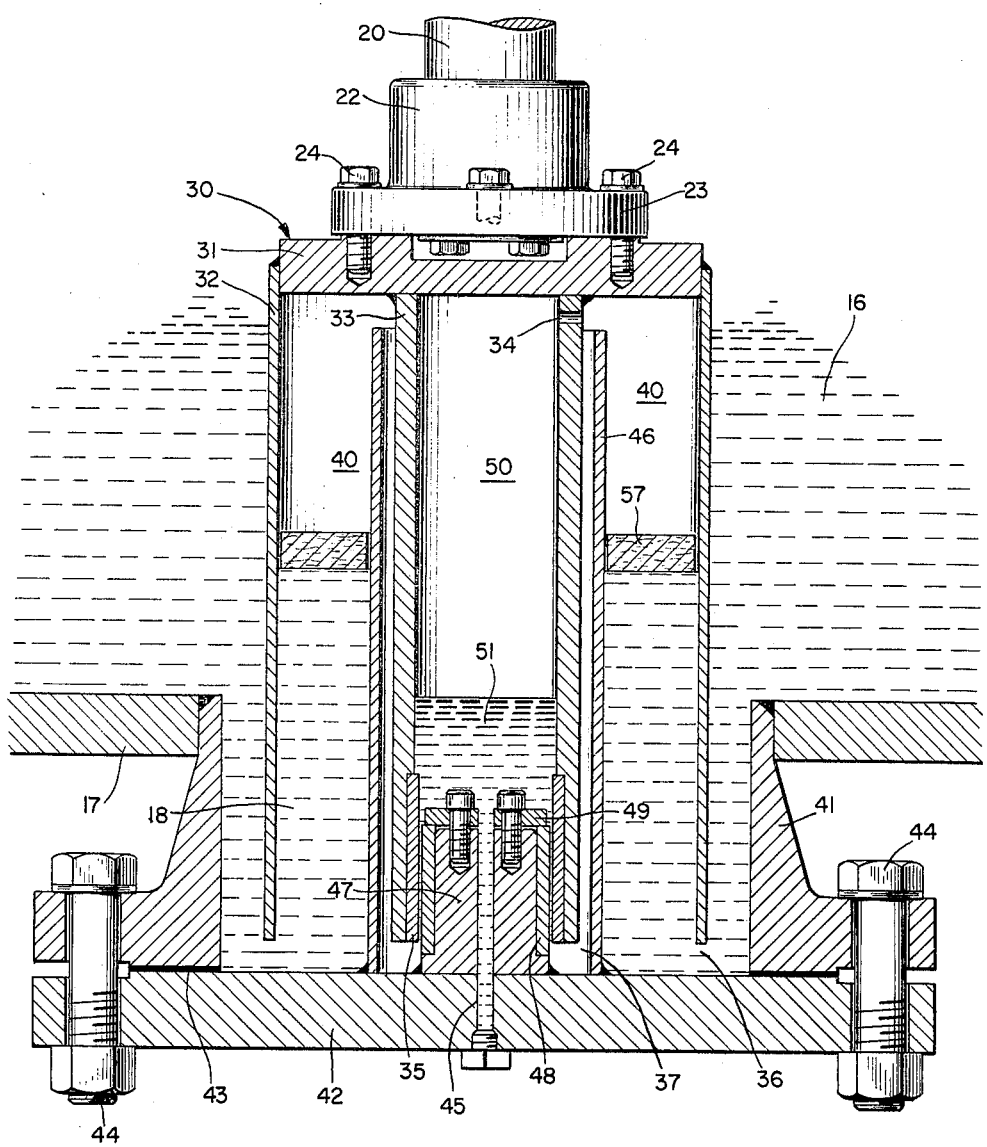
FIG. 2 is an enlarged view, in section, of that portion of FIG. 1 shown in dot-and-dash line and identified as II.

In accordance with one form of the present invention, there is provided, at the lower end of the agitator shaft 20, a shaft extension and bearing assembly 30 the structural details of which are shown in FIG. 2.

Referring now to FIG. 2, the tank floor 17 is shown to be provided with a well 18 formed by an annular flange 41 which is supported in depending position from the tank floor. Secured to the bottom of the annular flange 41, as by bolts 44, is a circular flange plate 42. Fixed, as by welding, to the center of the circular flange plate 42, and projecting upwardly therefrom, is a cylindrical bearing body 47 having thereabout an annular bearing 48 preferably nylon, which is held in place by a bearing retainer 49.

The lower end of the agitator shaft 20 is provided with an adapter or connector comprising a collar 22 having a flanged base plate 23 which is bolted to the end of the shaft 20. The adapter plate 23 is bolted, as by bolts 24, to an enlarged circular plate 31 which is a component part of the shaft extension. Secured, as by welding, to the under surface of the plate 31, and projecting downwardly therefrom, is a hollow cylindrical member 33, preferably steel, which functions as the shaft extension. This member 33 extends down into well 18 almost to the upper face of flange plate 42. The lower end of shaft extension 33 is provided with an internal annular bearing member 35 which rotates with the shaft 20. This rotating bearing 35, preferably nylon, bears against the fixed annular bearing 48 mounted on the fixed bearing body 47.

Secured, as by welding, to the side of enlarged plate 31, and concentrically and coextensively disposed relative to the hollow shaft extension 33, is a hollow cylindrical member 32, preferably steel, which extends downwardly into well 18, almost to the upper surface of plate 42. This member 32 functions as the outer wall of an annular separation chamber 40 having at the lower end thereof an annular opening 36 which provides communication to the tank body. The inner wall of the separation chamber 40 is defined by a hollow cylindrical steel member 46 which is secured, as by welding, to the plate 42 and which extends upwardly therefrom toward and almost to the under surface of the plate 31.

Above the upper end of the member 46, the wall of the hollow cylindrical shaft extension 33 is provided with an aperture 34 which allows air (or other gas) to pass between the annular separation chamber 40 and the interior or central chamber 50. The central chamber 50 is defined by the hollow cylindrical shaft extension member 33, the undersurface of plate 31, and the retaining plate 49.

While not essential to the invention, an annular cork 57 may be provided in the annular chamber 40. This work 57 will float on the tank liquid 16, when the tank liquid enters the separation chamber 40 through the annular opening 36.

It will be understood that the structure of the present invention, described above, is installed before liquid is introduced into the tank.

Illustrated in FIG. 2, but not essential to the present invention, is a fluid 51 shown in the lower portion of the central air chamber 50. Fluid 51 is a supply of lubricant for the annular bearings 35 and 48.

When the liquid 16 is introduced into the tank 15, it enters the annular chamber 40 through the annular opening 36 at the lower end of the cylindrical member 32 and forces the cork float 57 to rise within the annular chamber 40. The rise of the liquid 16 and float 57 compresses the air which is trapped within chambers 40 and 37 and causes air to move through the passageway 34 into the central air chamber 50, where it is also trapped. Thus, the air in chambers 40, 37, and 50 is compressed, the extent of the compression being dependent upon the height and weight of the tank liquid 16, and also upon whether or not the tank is pressurized.

As the liquid 16 and float 57 rise, and the trapped air is further compressed, the reaction force of the compressed air increases, which opposes the further rise of the liquid 16 and float 57, and a stabilization level is reached which is below the upper edge of the inner wall 46 of the annular separation chamber 40. Thus, the liquid 16 is prevented from entering the annular chamber 37 and the central air chamber 50, and thus the bearings 35 and 48 are isolated from the liquid 16.

The supply of lubrication fluid 51 may be replenished as required through the plugged duct 45. If desired, gauge means (not shown) may be provided outside the tank to indicate visually the level of the lubrication fluid 51 and/or the level of the tank fluid 16. The provision of such visual gauge means is well within the skill of those skilled in the art.

While the foot-bearing assembly illustrated in FIGS. 1 and 2 and described above incorporates the basic gas-entrapment concept of the present invention for isolating the foot-bearing assembly from the tank liquid, the preferred form of foot-bearing assembly is illustrated in FIGS. 3, 4 and 5, and will now be described.

FIG. 3 is a simplified diagrammatic representation of a closed tank 115 having therein a liquid 116, the upper level of which is represented by the dot-and-dash line 116a. Extending down into the liquid 116 is an agitator shaft 120 having thereon an impeller 121 for agitating the liquid. Below the lower end of the shaft 120 is a foot-bearing assembly indicated generally by the reference numeral 130. A portion of this assembly 130 is secured to the shaft 120 and rotates therewith. The remaining portion is supported on the flange 142 secured to the bottom 117 of the tank. A hollow pipe 145 extends upwardly from the flange 142 into an axial bore in the rotatable shaft extension. A feed pipe 147 connects to the lower end of pipe 145 for injection of lubrication oil, or compressed air or gas, for purposes to be described.

Structural details of the foot-bearing assembly 130 are illustrated in FIGS. 4 and 5. In the drawing, the lower end portion 120a of shaft 120 is shown to be of reduced diameter, forming the shoulder 125. Embracing the reduced-diameter portion of the shaft is a split clamp 122 secured by the bolts 124. Secured, as by welding, to the lower end of the split clamp 122 and fitting into the interior thereof, is a shaft-extension stub 133 the lower end portion of which is of reduced diameter. Embracing the reduced diameter portion 133a of the stub extension 133 is an annular bearing 135 which is supported in the cylindrical bearing stand 146 which projects upwardly from the flange 142 and is secured thereto, as by welding.

Secured, as by welding, to the lower end and outer surface of the split clamp 122 is a cylindrical bearing housing member 132, the lower end portion 132a of which is of enlarged diameter, as shown. The bearing housing member 132, 132a, encircles the fixed cylindrical bearing stand 146, but terminates above the flange 142 thereby providing access into the annular space between the members 132a and 146 for the tank liquid 116.

The extension stub 133, 133a has an axial cavity 150 which is open at the lower end but closed at the upper end. A hollow pipe 145 having a threaded lower end is screwed into a tapped hole in the flange 142, and extends upwardly into the cavity 150. Also threaded into the flange 142 opposite to and coaxially aligned with the hollow pipe 145, and in communication therewith, is an external piping 147.

With the tank 115 empty of liquid, a lubricating oil for bearing 135 may be first introduced through the feed pipe 147, valve 151, and upstanding pipe 145. The oil introduced overflows pipe 145 and runs down cavity 150 to fill the chamber 137 below the bearing 135 and also to fill at least the lower part of the annular chamber 138 which surrounds the extension stub 133, 133a above the bearing. Thus, the bearing 135 is maintained in a bath of oil. The oil in pipe 145 may then be removed through valve 151 and line 147, and valve 151 may then be closed.

The liquid 116 is then delivered to the mixer tank 115, and, during the filling of the tank, liquid flows through the annular opening below the bearing housing 132, 132a, into the annular chamber 140 formed between the bearing housing and the bearing stand 146, thereby compressing the air which is trapped above the level of the liquid in chamber 140. This air is trapped in the upper portion of chambers 140, 138, in the radial passage 134, and in the upper portion of cavity 150 by the oil which fills chamber 137, and the lower portions of chambers 138 and cavity 150.

As the quantity of liquid 116 delivered to tank 115 increases, during the filling thereof, the level of the liquid 116 in chamber 140 rises and the trapped air becomes more and more compressed and the downward force exerted by the compressed air on the liquid 116 in chamber 140 becomes greater and greater thereby slowing down the rate at which the liquid level rises in chamber 140.

The design is such that when the tank 115 is filled to its desired level, indicated by the dot-and-dash line 116a in FIG. 3, the level of the liquid 116 in chamber 140 is below the upper edge of the bearing stand 146, thus preventing the liquid from spilling over the bearing stand 146 and down chamber 138 to the bearing 135. Thus, the bearing 135 is isolated by an air (or gas) barrier from the corrosive liquid 116. Preferably, the design is such that the liquid level in chamber 140 is in the region 132a of enlarged diameter of housing 132.

During mixing, heat is generated and gases are evolved from the liquid 116 which collect in the area above the liquid level 116a. Assuming the tank 115 to be a closed tank, these heated gases expand and apply a downward pressure on the upper surface of the liquid, which, unless precautionary measures are taken, could be of sufficient magnitude to cause the liquid level in chamber 140 to rise to above the upper end of bearing stand 146, in which case liquid 116 would reach the bearing 135. To prevent such an event, and to maintain adequate pressure in chamber 140, compressed air may be continuously applied at a low rate through line 147 and valve 151, with valve 151 almost closed but open enough to provide a small orifice.

In installations where a closed tank is to be operated under pressure, the required tank pressure may be applied by any one of several methods. In one method, a source of compressed air may be connected to the top of the tank above the liquid level 116a, and simultaneously a source of compressed air may be connected to the open valve 151 to develop the required high pressure in cavity 150 and chamber 140 to hold the level of the liquid 116 at about the position illustrated in FIG. 4.

In another method, the application of compressed air directly to the top of the tank may be omitted, and compressed air applied through the line 147 and valve 151 under sufficient pressure to drive the liquid level in chamber 140 down to the lower edge of the chamber, so as to allow the supplied compressed air to bubble up through the tank liquid 116 to the top of the tank. When the pressure above the liquid in the tank has reached the desired magnitude, the application of compressed air through the valve 151 is discontinued.

In both of the above methods, compressed air may be continuously applied at a very slow rate through the almost-closed valve 151 to provide sufficient pressure in the upper portion of chamber 140 to hold the liquid level down despite an expected increase in pressure at the tank top due to heat generated during operation.

Irrespective of whether the tank is open or closed and under pressure, the preferred operation calls for the entrapped air to oppose the rise of tank liquid 116 in chamber 140 with sufficient force to prevent the liquid level from rising into the upper or reduced diameter portion of chamber 140. An advantage of having chamber 140 of reduced diameter at its upper portion is that turbulence of liquid is reduced.

While the preferred embodiments of this invention have been described in some detail, it will be obvious to one skilled in the art that various modifications may be made without departing from the invention as hereinafter claimed.

What is claimed is:
1. In a mixing tank:
   (a) a rotatable agitator shaft having a lower end portion projecting downwardly toward the bottom of the tank;
   (b) bearing means supported near the bottom of said tank for providing transverse support to the lower end of said shaft;
   (c) isolation means, including air-entrapment means, for isolating said bearing means from the tank liquid, said isolation means comprising:
      (c-1) a hollow cylindrical stand of material impervious to gas and liquid fixed to the floor of the tank and encircling the lower end portion of the shaft;
      (c-2) a hollow cylindrical housing of material impervious to gas and liquid encircling said stand and connected to and adapted to rotate with the agitator shaft, forming between said fixed stand and said housing an annular chamber open at its lower end to provide communication between said annular chamber and the tank body to allow for flow of tank liquid therethrough;
   (d) said lower end of said agitator shaft being provided with an axial cavity,
   (e) a lateral passage between said axial cavity and the upper portion of said annular chamber,
   (f) a hollow pipe mounted on the floor of said flange and projecting upwardly into said axial cavity, and
   (g) conduit means communicating with the lower end of said hollow pipe for supplying oil or gas to said hollow pipe.

2. Apparatus according to claim 1 characterized in that said lower end of said agitator shaft includes an extension stub separate from said shaft and secured thereto.

3. Apparatus according to claim 2 characterized in that said bearing means is an annular band disposed between said stand and the lower end of said shaft.

4. Apparatus according to claim 3 characterized in that said bearing means are supported by said cylindrical stand.

References Cited
UNITED STATES PATENTS

| | | | |
|---|---|---|---|
| 714,007 | 11/1902 | Mittag | 308—36.3 |
| 2,023,107 | 12/1935 | Stoddard | 308—36.3 X |
| 2,143,373 | 1/1939 | Gaertner | 308—36.3 |
| 2,318,114 | 5/1943 | Tichvinsky | 308—134.1 |
| 2,592,612 | 4/1952 | Smith | 308—134.1 |
| 2,601,731 | 7/1952 | Trede | 308—36.3 |
| 2,725,118 | 11/1955 | Clark | 184—6 W |
| 3,020,098 | 2/1962 | Mercier | 308—36.3 |
| 3,327,953 | 6/1967 | Krumholz | 308—36.3 |

MARTIN P. SCHWADRON, Primary Examiner

L. L. JOHNSON, Assistant Examiner

U.S. Cl. X.R.

259—107; 308—134.1, 168